(No Model.)
C. H. MILLS.
HOLDBACK FOR VEHICLES.
No. 580,879. Patented Apr. 20, 1897.
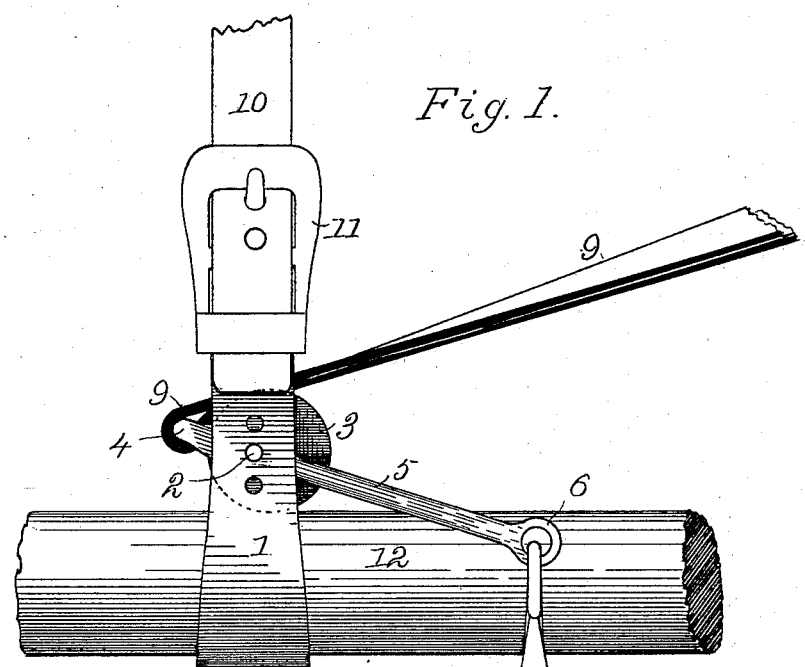
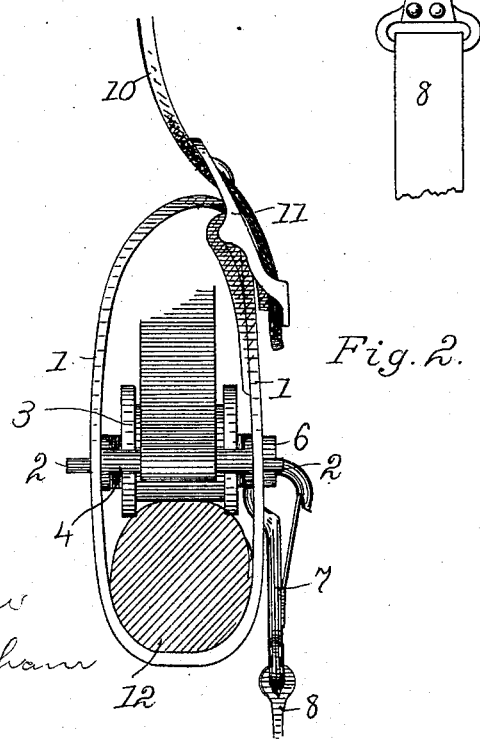
Attest,
Ina Graham
Nora Graham
Inventor
Clyde H. Mills
by L. P. Graham
his Atty

UNITED STATES PATENT OFFICE.

CLYDE H. MILLS, OF DECATUR, ILLINOIS.

HOLDBACK FOR VEHICLES.

SPECIFICATION forming part of Letters Patent No. 580,879, dated April 20, 1897.

Application filed February 11, 1897. Serial No. 622,909. (No model.)

*To all whom it may concern:*

Be it known that I, CLYDE H. MILLS, of Decatur, in the county of Macon and State of Illinois, have invented certain new and useful Improvements in Holdbacks, of which the following is a specification.

This invention is exemplified in the structure hereinafter described, and it is defined in the appended claims.

In the drawings forming a part of this specification, Figure 1 is a side elevation of a holdback embodying my invention, and Fig. 2 is a front elevation of the same.

In constructing a holdback in accordance with my ideas a strap, as 1, is formed into a loop adapted to receive a shaft and have considerable room to spare, a buckle, as 11, being used to connect the ends of the strap. Above the shaft some little distance a pin 2 extends horizontally through the loop and journals in the sides thereof. A bail 4 is fixed on the pivot-pin 2, and it crosses from side to side of the loop in front of the pin. One side of the bail is extended rearward in the form of an arm, as 5, and such arm has a perforated termination, as shown at 6. A roller 3 is fastened eccentrically on the pivot-pin and is held between the arms of the bail. A holdback-strap 9 is connected with the bail 4 and extended backward to the hip-strap of the harness. A belly-strap 8 has a hook 7, that engages the eye of arm 5, and it is adapted to extend under the horse's belly and engage a similar arm on the opposite side. A strap 10 provides means for connecting the loop with the back-band of the harness.

The arrangement of the eccentric-roller with reference to the shaft and the loop is such that the portion that extends farthest from the pin is to the rear of the pin when the device is in operation, and downward pull on arm 5 or upward pull on the bail tends to force the roller into close contact with the shaft. When the horse is hitched in the shafts, the strap 8 is made of proper length to tighten the roller slightly against the shaft, thereby holding it in proper position, and whenever the vehicle runs forward onto the horse or the horse backs against the vehicle the holdback-strap 9 will pull against the bail 4 and by forcing the roller against the shaft effectually prevent slippage.

Having thus described my invention, I claim as new and desire to secure by Letters Patent—

1. A holdback for shafts, comprising a shaft-supporting loop, an eccentric journaled in the loop and adapted to bear against the shaft, and a holdback-strap connected with the eccentric in such manner that backward pull on the strap forces the eccentric against the shaft, substantially as set forth.

2. A holdback for shafts, comprising a shaft-supporting loop, an eccentric journaled in the loop, a bail fastened to the eccentric and crossing the loop in front of the front surface of the eccentric, an arm extending rearward from the bail, a belly-band connected with the rearward-extended arm, and a holdback-strap connected with the bail, substantially as set forth.

In testimony whereof I sign my name in the presence of two subscribing witnesses.

CLYDE H. MILLS.

Attest:
GEORGE HARPSTRITE,
L. P. GRAHAM.